United States Patent [19]

Baka

[11] Patent Number: 5,351,827
[45] Date of Patent: Oct. 4, 1994

[54] RETURNABLE PACKAGING SYSTEM FOR AWNINGS

[75] Inventor: Gregory J. Baka, Corunna, Ind.

[73] Assignee: The Dometic Corporation, LaGrange, Ind.

[21] Appl. No.: 83,067

[22] Filed: Jun. 25, 1993

[51] Int. Cl.⁵ .................... B65D 85/20; B65D 85/66; B60P 7/12; B61D 3/16
[52] U.S. Cl. ................. 206/443; 206/391; 410/36; 410/117
[58] Field of Search ............ 206/443, 391, 394, 326; 410/32, 42, 36, 117, 37, 118, 78, 79, 85; 211/59.4

[56] References Cited

U.S. PATENT DOCUMENTS

| | | | |
|---|---|---|---|
| 1,993,216 | 3/1935 | Marshall | 410/36 |
| 2,170,913 | 8/1939 | Rowe | 410/117 |
| 3,196,229 | 7/1965 | Glass | 206/443 |
| 3,263,830 | 8/1966 | Anderson | 410/117 X |
| 3,272,329 | 9/1966 | Mehalov | 206/443 |
| 3,786,932 | 1/1974 | Smith | 206/443 X |
| 4,444,311 | 4/1984 | Rias | 206/391 |
| 4,964,771 | 10/1990 | Callihan | 410/118 |

*Primary Examiner*—Bryon P. Gehman
*Attorney, Agent, or Firm*—Pearne, Gordon, McCoy & Granger

[57] ABSTRACT

A returnable and reusable shipping and storing system for elongated members, such as rolled awnings. The system includes a cart upon which a series of awning support plates are stacked. Each support plate has a wave-like structure which cooperates with vertically adjacent support plates to define a series of elongated channels. The channels are adapted to slidably receive the rolled awnings, and allow individual rolled awnings to be removed from the stack of support plates regardless of their vertical position within the stack. The awnings project in a cantilever fashion from the support plates, the projecting ends being protected and supported by awning end bags. The awning support plates are nestable to reduce the vertical height required for storage and re-shipment to the awning manufacturer, thereby reducing the inventory and shipping expenses of the system. The end bags preclude the awnings from moving longitudinally, and thereby prevent the awnings from sliding out of the elongated channels during shipment thereof.

12 Claims, 3 Drawing Sheets

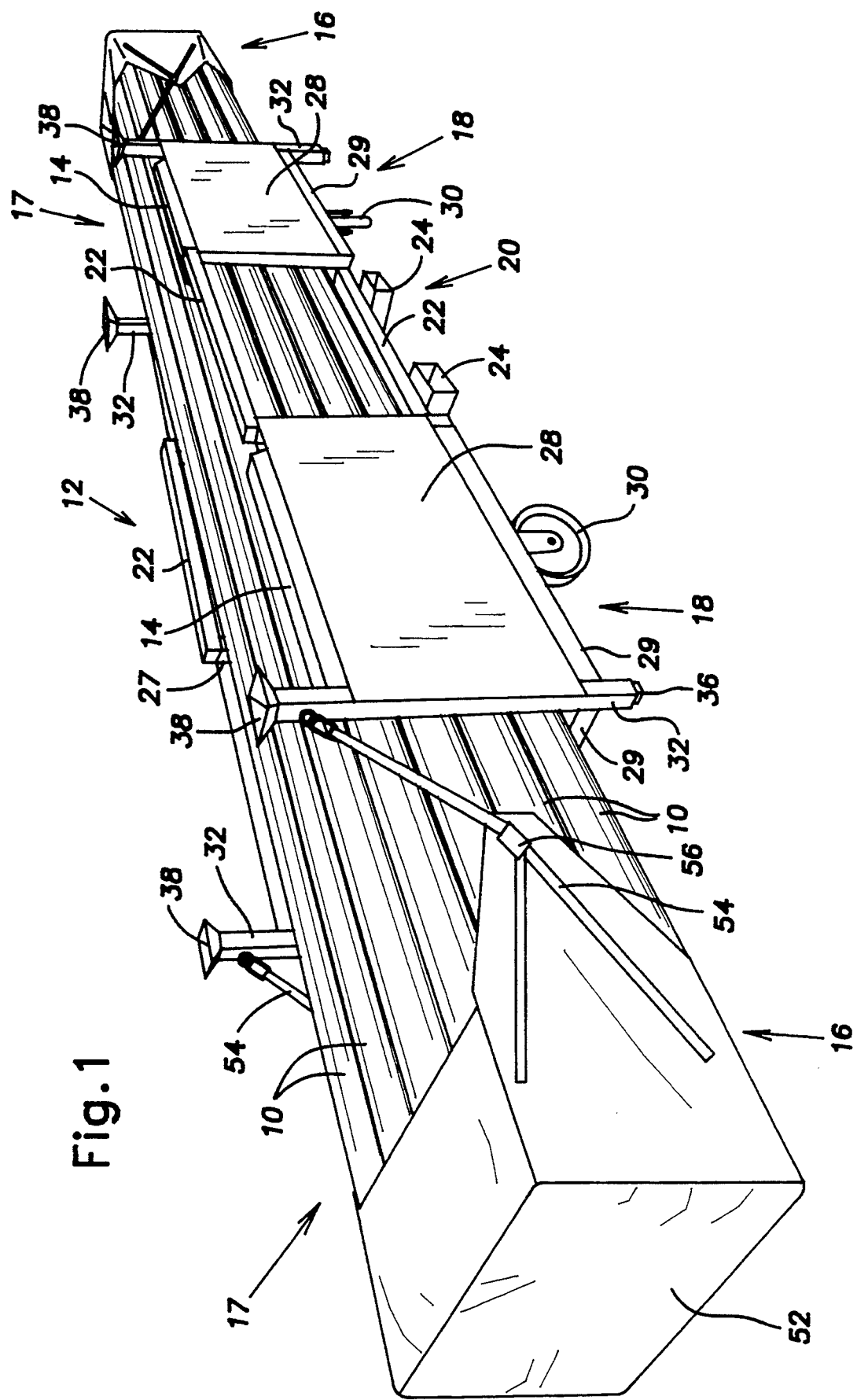

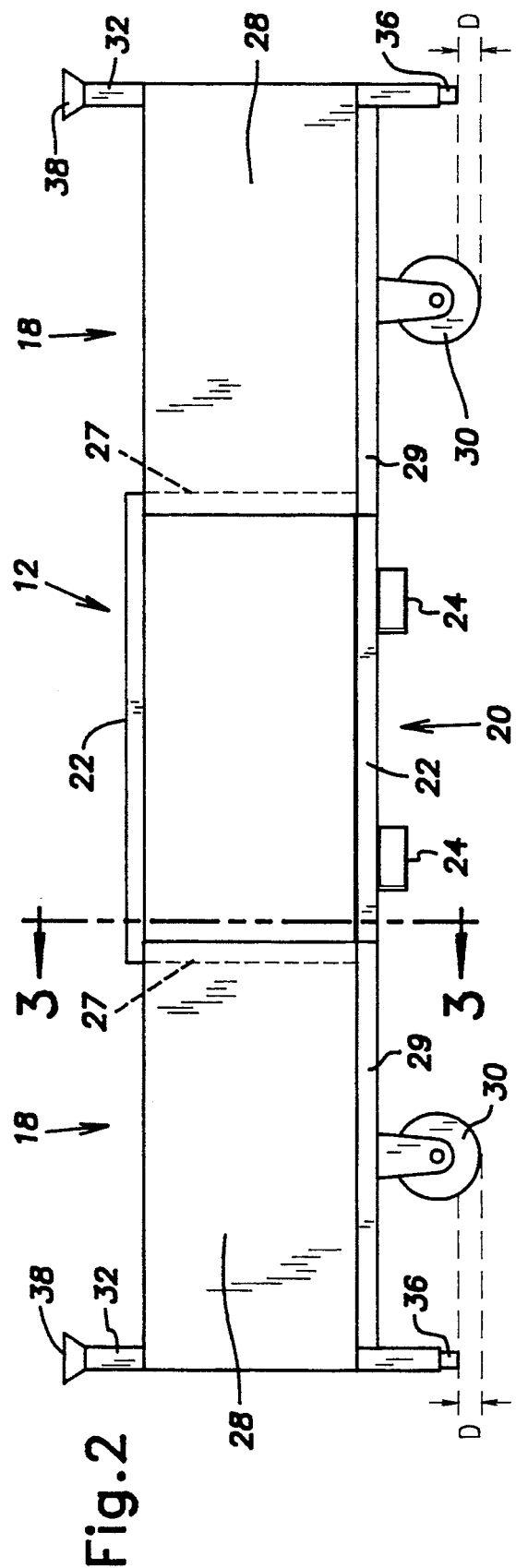
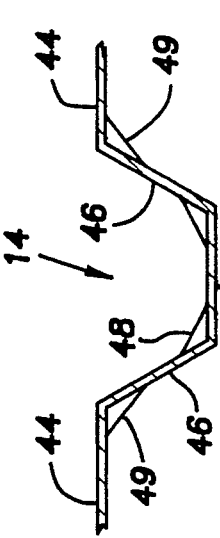
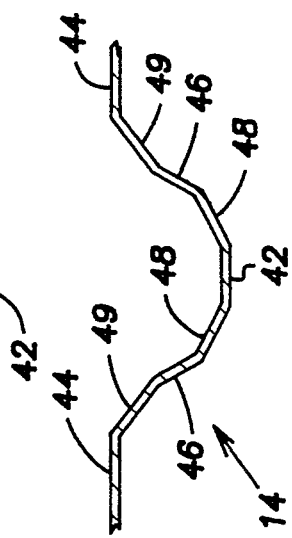
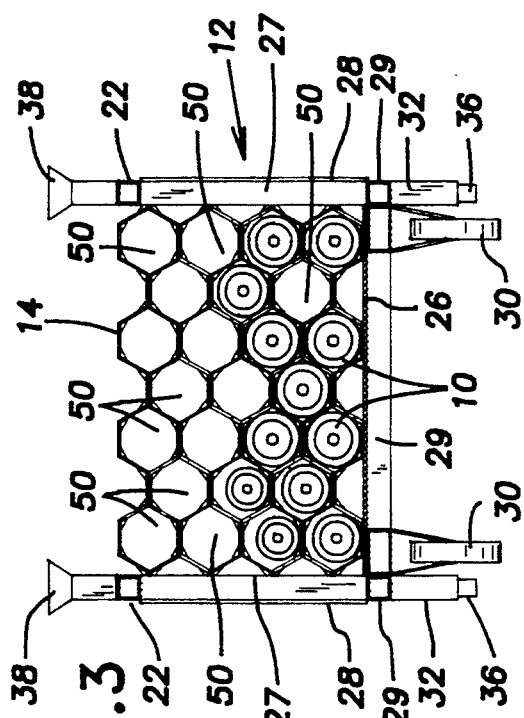

RETURNABLE PACKAGING SYSTEM FOR AWNINGS

BACKGROUND OF THE INVENTION

FIELD OF THE INVENTION

The present invention pertains to rolled awnings and, more particularly, to a returnable and reusable packaging and storage system for such rolled awnings.

DESCRIPTION OF THE RELATED ART

Rolled awnings are conventionally placed in elongated rigid cardboard tubes to protect them during shipment and storage. Although the cardboard tubes are satisfactory to prevent damage to the awnings, the tubes themselves are rather expensive, and insertion of the awnings into the tubes represents an extra step and additional expense in the manufacture of the awnings. Moreover, since it is undesirable from a cost standpoint to return the empty tubes to the manufacturer, the used cardboard tubes create a disposal problem for the retailer.

From an environmental perspective, the tubes are undesirable as their manufacture requires natural resources which are becoming increasingly expensive and their disposal takes up much-needed landfill space. Hence, the acquisition and disposal costs of these cardboard tubes, as well as their burden on the environment, can be expected to increase in the coming years.

Finally, since the retailer typically purchases a variety of awnings having different lengths, colors, and fabrics, the cardboard shipping tubes and awnings create an inventory and retrieval problem for the retailer. Namely, when a specific awning is desired for purchase or inspection, the particular cardboard tube containing that awning must be located within a stack of tubes and thereafter manually pulled or otherwise removed from the stack of awning shipping tubes to gain access to the desired awning therein. This is not only difficult, but disrupts the order of the remaining shipping tubes and renders inventory control and awning retrieval problematic.

Therefore, there exists a need in the art for a returnable and reusable rolled awning transport and storage system. There also exists a need in the art for an awning storage system which permits easy insertion of awnings therein and removal of awnings therefrom.

SUMMARY OF THE INVENTION

In accordance with the present invention, a reusable and returnable rolled awning transport and storage system is disclosed. The system is adapted to support and maintain the awnings in a rolled condition during transport and subsequent storage. The system provides a plurality of elongated storage spaces which are easily accessible for placement of awnings therein and removal of awnings therefrom, regardless of the relative vertical position of the storage space.

In further accordance with the present invention, the transport and storage system includes one or more independently movable and stackable carts. Each cart is capable of holding and supporting a number of rolled awnings. The system further provides means for protecting ends of the rolled awnings which extend or project from the cart in a cantilever fashion and for preventing longitudinal movement of the rolled awnings. The protecting means are operably associated with the cart, and are adjustable to give access to the cantilever ends of the awnings.

In further accordance with the present invention, the packaging and storing system includes a plurality of nestable and stackable awning support plates. The plates are received and vertically supported by the cart and cooperate, when in a stacked configuration, to define a series of elongated storage channels for receipt of the awnings. The awning support plates vertically support one another such that each rolled awning may be slidably withdrawn from its respective elongated storage channel regardless of the vertical position of the awning or channel within the stack of support plates.

In accordance with the present invention, the awning support plates vertically support each other when in the stacked configuration during transport and storage of the rolled awnings. The awning support plates nest with each other to reduce their overall vertical height, which is desirable for long-term storage of the support plates, or for return shipment (i.e., without rolled awnings) of the system to the awning manufacturer.

In accordance with the present invention, the awning support plates support and protect the individual awnings during transport and subsequent storage, and remove the need for individual awning protectors such as cardboard tubes.

BRIEF DESCRIPTION OF THE DRAWING FIGURES

These and further features of the present invention will be apparent with reference to the following description and drawings, wherein:

FIG. 1 is a perspective view of the returnable and reusable awning transport and storage system of the present invention;

FIG. 2 is a front elevational view of an awning transport and storage cart in accordance with the present invention;

FIG. 3 is an cross sectional view of the transport and storage cart in accordance with the present invention, as viewed from line 3—3 of FIG. 2, with rolled awnings placed therein;

FIG. 6 is an elevational view, in cross section, of the awning support plate, as viewed from line 6—6 of FIG. 4; and FIG. 7 is an elevational view, in cross section, of the awning support plate, as viewed from line 7—7 of FIG. 4.

DETAILED DESCRIPTION OF THE PREFERRED EMBODIMENT

Figure 4:
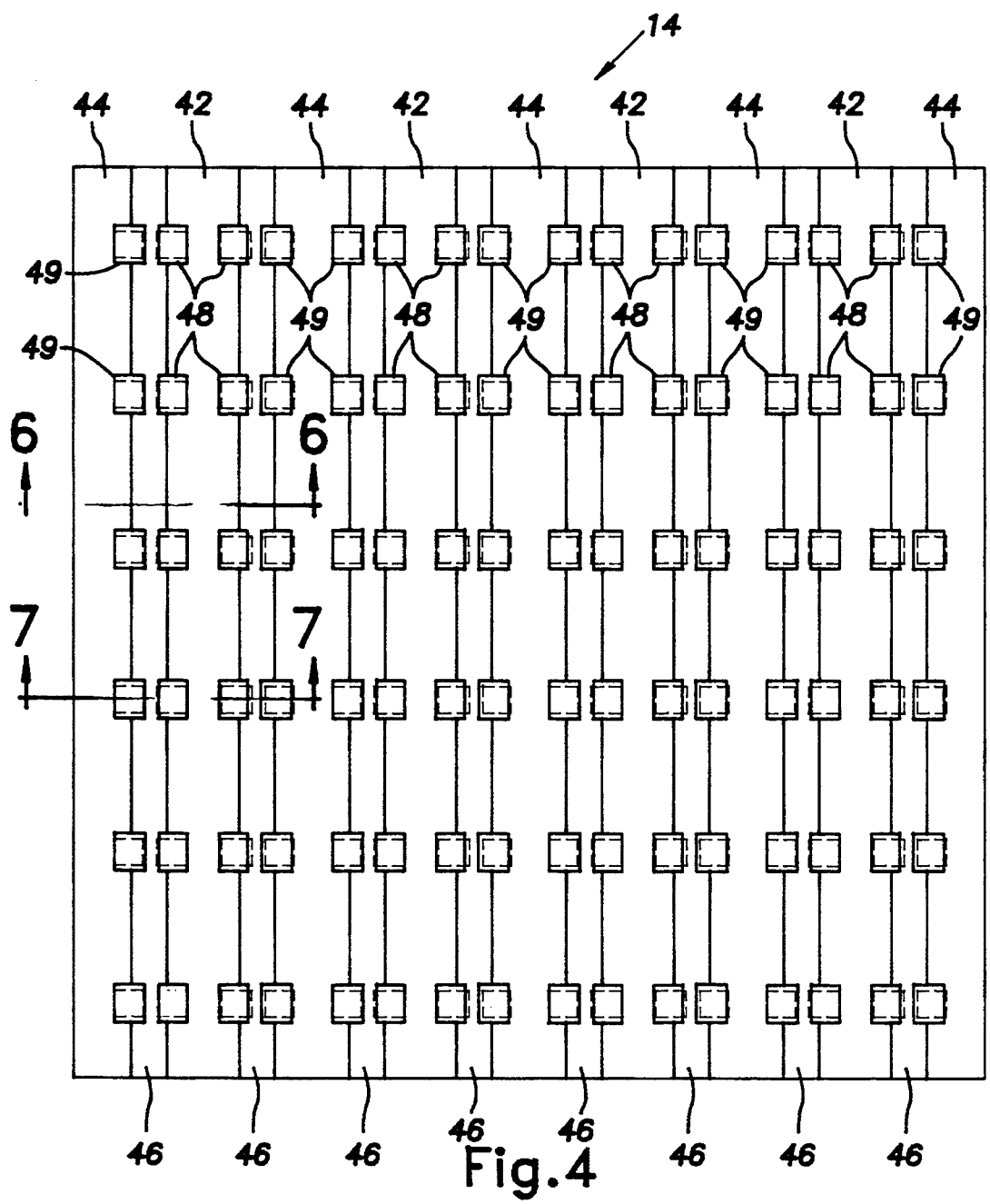
FIG. 4 is a top plan view of an awning support plate in accordance with the present invention.

With reference to the drawing figures and, in particular, FIGS. 1-3, the returnable and reusable awning transport and storage system of the present invention is shown. The awning transport and storage system is adapted and arranged to allow the safe and protected transport and storage of a number of rolled awnings 10. Preferably, the rolled awnings, which are adapted for use on residential and commercial buildings, as well as on travel trailers, mobile homes, motor homes, and the like, are wrapped or enclosed by a flexible plastic bag (not shown) or other protective material to prevent damage to the awning from liquids and the like.

The awning transport and storage system generally includes a cart 12, a plurality of awning support plates 14, and a pair of awning end bags or covers 16. As shown best in FIG. 1, the awning end bags 16 attach to opposite ends of the cart 12, and protect and cover ends 17 of the rolled awnings 10 which would otherwise project in an exposed and unprotected manner from the cart 12. The end bags 16 limit axial or longitudinal movement of the awnings 10 which are otherwise free to slide longitudinally along the support plate 14, as will be described more fully hereafter.

With continued reference to FIGS. 1 and 2, the cart 12 is shown to include a pair of awning support sections 18 and an intermediate, open section 20. The awning support sections 18 are adapted to receive and support the awning support plates 14 (FIG. 3). The open section 20 includes a series of upper and lower horizontal support members 22 and a pair of widthwise-directed channels 24.

The upper and lower support members 22 interconnect the awning support sections 18. The pair of channels 24 are adapted or arranged to receive forklift forks (not shown) and, preferably, extend the width of the cart 12 to allow a forklift to lift the cart from either side. The intermediate section 20 is open at a top, each end, and each lateral side, as illustrated.

The awning support sections 18 include a bottom panel 26, a pair of vertical support posts 27, a pair of side panels 28, and a series of horizontal support members 29. The awning support sections 18 are open at each end and at a top, as illustrated. The horizontal support members 29 vertically support the bottom support panel 26.

Wheels 30 extend downwardly from the awning support sections 18 and allow the cart 12 to be manually pushed or transported, which is helpful in moving the cart when there is no forklift available or when moving with a forklift is not feasible.

A vertical leg 32 is provided at each corner of the cart 12. The legs 32 cooperate with the horizontal support members 29 and the vertical support posts 27 to define a supporting framework for the awning support sections 18. The side panels 28 extend between the legs 32 and the vertical support posts 27, as illustrated.

As shown best in FIG. 2, a lower terminal section 36 of the cart-supporting leg 32 is upwardly spaced a distance D from a bottom of the wheels 30 (i.e., from the support surface), and is of a relatively smaller size than the remainder of the leg 32. This smaller lower terminal section 36 is adapted to be received within an enlarged upper terminal section 38 of a downwardly adjacent leg. Receipt of the lower terminal section 36 by the upper terminal section 38 allows the carts to be vertically stacked which is helpful in shipping and storing multiple carts. The lower section 36 is upwardly spaced from the support surface to allow the wheels 30 to freely rotate and thereby propel or move the cart without interference from the legs 32.

Preferably, the overall length of the cart 12 is about 120 inches. Each of the awning support sections 18 is about 36 inches, with about 18 inches being between each of the forklift receiving channels 24. Preferably, the cart also has a width of about 36 inches and a vertical height of about 34 inches. The usable height of the cart 12, which is generally equal to the vertical height of the side panels 28 of the awning support sections 18, is about 20 inches.

Figure 5:
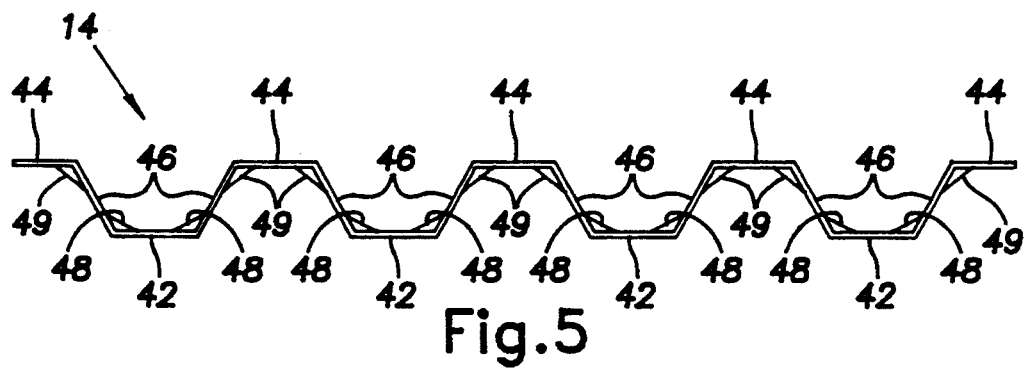
FIG. 5 is an elevational view of the awning support plate in accordance with the present invention.

With reference to FIGS. 4–7, one of the awning support plates 14 of the present invention is shown. With particular reference to FIG. 5, the awning support plate 14 is shown to define a wave-like surface. The wave-like surface provides a series of lower sections 42 and upper sections 44, the lower and upper sections 42, 44 being connected by intermediate ramping members 46, as illustrated. Hence, a repeating pattern of lower section 42, ramping section 46, upper section 44, and ramping section 46 is provided by the support plate 14. Lower braces 48 connect the ramping members 46 with the lower sections 42, while upper braces 49 connect the ramping members to the upper sections 44.

The awning support plates 14 are designed to alternatively stack or nest. As illustrated in FIG. 3, when the support plates 14 are in the stacked configuration the lower sections 42 of one support plate abut and rest on the upper sections 44 of a downwardly adjacent awning support plate. Likewise, the upper sections 44 of an awning support plate abut and support the lower sections 42 of an upwardly adjacent awning support plate. As such, the vertically adjacent and stacked awning support plates 14 define a series of elongated awning-receiving channels 50.

The awning-receiving channels 50 are designed to be slightly larger than the awnings 10 which are placed therein. Sizing of the elongated channels 50 as such allows the awnings 10 to be freely and slidably movable within the channels The support plates are preferably placed in a nested configuration for return shipment to the awning manufacturer or for prolonged storage by the awning manufacturer. When nested, the lower sections 42 of the awning support plates are in contact with the lower braces 48 between a downwardly adjacent lower section 42 and ramping section 46. Likewise, the upper braces 49 are in contact with an upper surface of a downwardly adjacent support plate upper section 44.

The awning support plates 14 are vertically stacked on the support sections 18 of the cart, leaving the open section 20 therebetween. The awnings 10 typically have a length which is greater than that of the cart 12. Therefore, the ends 17 of the awnings 10 extend or project from the elongated channels 50 defined by the awning support plates in an unsupported or cantilever fashion, as illustrated. The projecting or cantilever ends 17 of the awnings are covered by the pair of awning end bags 16. The end bags 16 limit longitudinal movement of the awnings, and thereby prevent the awnings from sliding out of the elongated channels 50 during transport.

The awning end bags 16 provided by the present invention comprise a fabric main section 52 and a series of straps The straps 54 are provided on opposite sides of the main section 52 and connect to an adjacent vertical leg 32 provided by the cart 12. Preferably, the straps 54 are releasably locked to the vertical legs 32. Typically, ends of the straps 54 will be locked to the legs 32 by the manufacturer or shipper to prevent the end bags 16 from being accidentally misplaced by the retailer. Upon return of the empty cart to the manufacturer, the end bags 16 are released or unlocked from the legs to ease re-loading of the cart. Length adjustment means 56 are provided by the straps 54 to ensure a close supporting fit between the main section 52 and the awning ends 17. The length adjustment means 56 also allow the end bags 16 to be removed from the awning ends 17, and thereby provide access to the awnings without unlocking the straps 54 from the legs 32.

The main fabric section 52 of the awning end bags 16 is designed and dimensioned to generally match the profile of the cantilever or projecting ends 17 of the awnings 10 and, therefore, provides a snug and continuous fit for the awning ends 17. The main section 52, which is preferably made of a durable fabric such as canvas, overlies and encloses the projecting ends 17 of the awnings, and helps to prevent damage to the awning ends 17 during shipment and subsequent storage. As shown best in FIG. 1, when the extending straps 54 are drawn tight, the awning end bag 16 engages the cantilever ends 17, and limits or otherwise prevents the awnings 10 from moving longitudinally.

Use of the aforementioned packaging system will be described hereafter with reference to the foregoing description and drawings. Starting with an empty cart 12, an awning support plate 14 is placed on the bottom panel 26 of each awning support section 18. The awning support plates 14 are positioned and retained between the side panels 28, the cart supporting legs 32, and the vertical support posts 27.

With the pair of awning support plates 14 (one for each awning support section 18) positioned on the cart 12, awnings 10 are placed on the support plates 14 in contact with the bottom section 42 thereof. The awnings 10 are received by and extend between the awning support plates 14. If the awnings are long enough, the ends 17 extend or project from the awning support plates 14 in an unsupported or cantilever fashion. Thereafter, another or second awning support plate 14 is stacked on the existing plate and awnings 10 are placed on the second support plate 14 in contact with the lower section 42 thereof. The process is repeated until the cart 12 is full.

As mentioned hereinbefore, the lower sections 42 and adjacent ramping members 46 of one support plate 14 cooperate with upper sections 44 and adjacent ramping members 46 of a vertically adjacent support plate to define the elongated awning-receiving channels 50. Also, the upper surfaces of an upper section 44 vertically support and engage lower surfaces of a lower section 42 provided by a vertically adjacent support plate 14. The elongated channels 50 are preferably larger in diameter than the awnings 10, thereby allowing any particular awning to be freely and slidably removed from the array of awnings within the system.

Once the desired number of awnings 10 are placed on the cart 12, the main section 52 of the awning end bag 16 is fitted or placed over the cantilever ends 17 of the awnings and the removable straps 54 are attached to the legs 32. The length adjustment means 56 are adjusted to force the main section 52 to cover or enclose the cantilever ends 17 of the awnings 10, as illustrated in FIG. 1. As stated hereinbefore, the main section 52 covers and protects the ends 17 of the awnings 10 during shipment and prevents lengthwise or longitudinal movement of the awnings.

If more than one cart 12 is to be shipped or stored, the carts can be vertically stacked upon one another to reduce the floor space required for shipment and storage. One cart is lifted, by a forklift or the like, and lowered on a downwardly adjacent supporting cart such that the smaller terminal sections 36 of the lifted cart legs 32 are received by the enlarged upper terminal section 38 of the lower cart legs. The wheels of the lifted cart are vertically adjacent or above the awnings carried by the lower cart.

While the preferred embodiment of the present invention is shown and described herein, it is to be understood that the same is not so limited but shall cover and include any and all modifications thereof which fall within the purview of the invention as defined by the claims appended hereto.

What is claimed is:

1. A returnable and reusable packaging and storing system for elongated tubular members, said system comprising a plurality of support plates and means for movably supporting said support plates, said support plates cooperating to define a series of elongated, generally horizontal channels, each of said channels surrounding and supporting an elongated tubular member, said elongated channels being dimensioned to allow the tubular members to be slidably removed therefrom and inserted therein without interference from adjacent tubular members and to permit ends of said tubular members to project from the channels in a cantilever fashion, wherein said supporting means comprises a cart having a pair of support plate supporting sections and an open section intermediate the supporting sections, each of said supporting sections having a plurality of support plates stacked thereon, thereby forming a pair of stacks of support plates which are separated by the open section, said elongated channels defined by one stack of support plates are generally coaxially aligned with the elongated channels defined by the other stack of support plates, wherein coaxially aligned channels receive and support spaced-apart sections of one of the elongated tubular members.

2. A returnable and reusable packaging and storing system for elongated tubular members according to claim 1, wherein each of said support plates comprise a series of upper and lower surface members which are interconnected by ramping surface members, the lower surface members of the support plates resting upon the upper surface members of a downwardly adjacent support plate.

3. A returnable and reusable packaging and storing system for elongated tubular members according to claim 2, wherein the upper surface member and a first pair of ramping members of a first support plate cooperate with the lower surface member and a second pair of ramping members of a second support plate to define one of the elongated channels.

4. A returnable and reusable packaging and storing system for elongated tubular members according to claim 3, wherein each support plate includes reinforcement braces, said braces being provided between the upper surface members and the ramping members and between the lower surface members and the ramping members.

5. A returnable and reusable packaging and storing system for elongated tubular members according to claim 1, wherein the cart includes means for aligning and retaining the support plates.

6. A returnable and reusable packaging and storing system for elongated tubular members according to claim 5, wherein the aligning and retaining means comprise a plurality of posts.

7. A returnable and reusable packaging and storing system for elongated tubular members, said system comprising:
a plurality of support plates which cooperate to define a series of elongated, generally parallel channels, each of said channels receiving and supporting an elongated tubular member, wherein the channels are sized and dimensioned to allow the tubular members to be slidably inserted therein and removed therefrom without interference from adjacent tubular members;

a movable cart upon which the support plates are stacked, said cart including means for positioning and retaining said support plates thereon, said cart comprising a pair of support sections and an open section intermediate the support sections, each of said support sections having a plurality of support plates stacked thereon, thereby forming a pair of stacks of support plates which are separated by the open section, said elongated channels of one stack of support plates are generally coaxially aligned with the elongated channels in the other stack of support plates, wherein coaxially aligned channels receive and support spaced-apart sections of one elongated tubular member.

8. A returnable and reusable packaging and storing system for elongated tubular members according to claim 7, wherein elongated tubular members are received within the elongated channels and the cart is sized such that ends of the tubular members project or extend therefrom in a cantilever fashion, said system further comprising means for protecting the cantilevered ends of the tubular members.

9. A returnable and reusable packaging and storing system for elongated tubular members according to claim 8, wherein said protecting means comprises an end bag, said end bag including a main body portion and a plurality of cart-engaging straps, said straps being adjustably attached to the cart to allow the main body of the end bag to snugly engage the tubular members, said main body protecting the ends of the tubular members and generally preventing said tubular members from moving longitudinally.

10. A returnable and reusable packaging and storing system for elongated tubular members according to claim 8, wherein said protecting means comprises an end bag, said end bag including a fabric main body and a plurality of cart-engaging straps, said straps being adjustable to allow the fabric main section to snugly engage the cantilever ends of the tubular members.

11. A returnable and reusable packaging and storing system for elongated tubular members said system comprising a plurality of support plates and means for movably supporting said support plates, said support plates cooperating to define a series of elongated, generally horizontal channels, each of said channels surrounding and supporting an elongated tubular member, said channels being dimensioned to allow the tubular members to be slidably removed therefrom and inserted therein without interference from adjacent tubular members and to permit ends of said tubular members to project from said elongated channels in a cantilever fashion, wherein said supporting means comprises a cart having a pair of support plate supporting sections and an open section intermediate the supporting sections, each of said supporting sections having a plurality of support plates stacked thereon to thereby form a pair of stacks of support plates which are separated from each other by the open section, said system including means for protecting the cantilevered ends of the tubular members and for preventing longitudinal movement of said tubular members.

12. A returnable and reusable packaging and storing system for elongated tubular members according to claim 11, wherein said protecting means comprises an end bag, said end bag including a main body portion and a plurality of cart-engaging straps, said straps being adjustably attached to the cart to allow the main body of the end bag to snugly engage the tubular members, said main body protecting the ends of the tubular members and generally preventing said tubular members from moving longitudinally.

* * * * *

UNITED STATES PATENT AND TRADEMARK OFFICE
CERTIFICATE OF CORRECTION

PATENT NO. : 5,351,827

DATED : October 4, 1994

INVENTOR(S) : Gregory J. Baka

It is certified that error appears in the above-identified patent and that said Letters Patent is hereby corrected as shown below:

Column 4, line 29, after "channels" insert --50.--.

Column 4, line 53, after "straps" insert --54.--.

Signed and Sealed this

Third Day of January, 1995

Attest:

BRUCE LEHMAN

*Attesting Officer*  *Commissioner of Patents and Trademarks*

REEXAMINATION CERTIFICATE (3030th)
United States Patent [19]
Baka

[11] B1 5,351,827
[45] Certificate Issued Oct. 15, 1996

[54] RETURNABLE PACKAGING SYSTEM FOR AWNINGS

[75] Inventor: Gregory J. Baka, Corunna, Ind.

[73] Assignee: The Dometic Corporation, LaGrange, Ind.

Reexamination Request:
No. 90/003,867, Jun. 5, 1995

Reexamination Certificate for:
Patent No.: 5,351,827
Issued: Oct. 4, 1994
Appl. No.: 083,067
Filed: Jun. 25, 1993

Certificate of Correction issued Jan. 3, 1995.

[51] Int. Cl.$^6$ ............... B65D 85/20; B65D 85/66; B60P 7/12; B61D 3/16
[52] U.S. Cl. ............... 206/443; 206/391; 410/36; 410/117
[58] Field of Search ............ 206/443, 391, 206/394, 326; 211/594; 410/32, 36, 42, 37, 78, 79, 85, 117, 118

[56] References Cited

U.S. PATENT DOCUMENTS

| | | |
|---|---|---|
| 1,993,216 | 3/1935 | Marshall . |
| 2,170,913 | 8/1939 | Rowe . |
| 2,196,470 | 4/1940 | Montgomery et al. . |
| 2,838,173 | 6/1958 | Emery . |
| 2,871,080 | 1/1959 | Shelly . |
| 2,990,951 | 7/1961 | Fallert . |
| 3,011,852 | 12/1961 | Mahan . |
| 3,196,229 | 7/1965 | Glass . |
| 3,263,830 | 8/1966 | Anderson . |
| 3,272,329 | 9/1966 | Mehalov . |
| 3,272,371 | 9/1966 | Weiner . |
| 3,282,458 | 11/1966 | Rudd . |
| 3,503,519 | 3/1970 | Jay . |
| 3,537,599 | 11/1970 | Jay . |
| 3,593,671 | 7/1971 | Bramlett . |
| 3,786,932 | 1/1974 | Smith . |
| 4,099,617 | 7/1978 | Nist, Jr. . |
| 4,195,732 | 4/1980 | Bell . |
| 4,210,202 | 7/1980 | Boyer et al. . |
| 4,247,237 | 1/1981 | Brown . |
| 4,293,071 | 10/1981 | Bridges . |
| 4,435,463 | 3/1984 | Roellchen . |
| 4,444,311 | 4/1984 | Rias . |
| 4,585,381 | 4/1986 | Boyse . |
| 4,832,196 | 5/1989 | Butler . |
| 4,883,177 | 11/1989 | Galbani . |
| 4,901,870 | 2/1990 | Wright et al. . |
| 4,964,771 | 10/1990 | Callihan . |
| 5,080,314 | 1/1992 | Moyer et al. . |
| 5,123,547 | 6/1992 | Koch . |
| 5,188,503 | 2/1993 | Appelberg . |

FOREIGN PATENT DOCUMENTS

| | | |
|---|---|---|
| 905558 | 1/1954 | Germany . |
| 3-13418 | 1/1991 | Japan . |
| 427647 | 6/1967 | Switzerland . |
| 0759360 | 9/1980 | U.S.S.R. . |

*Primary Examiner*—Bryon P. Gehman

[57] ABSTRACT

A returnable and reusable shipping and storing system for elongated members, such as rolled awnings. The system includes a cart upon which a series of awning support plates are stacked. Each support plate has a wave-like structure which cooperates with vertically adjacent support plates to define a series of elongated channels. The channels are adapted to slidably receive the rolled awnings, and allow individual rolled awnings to be removed from the stack of support plates regardless of their vertical position within the stack. The awnings project in a cantilever fashion from the support plates, the projecting ends being protected and supported by awning end bags. The awning support plates are nestable to reduce the vertical height required for storage and re-shipment to the awning manufacturer, thereby reducing the inventory and shipping expenses of the system. The end bags preclude the awnings from moving longitudinally, and thereby prevent the awnings from sliding out of the elongated channels during shipment thereof.

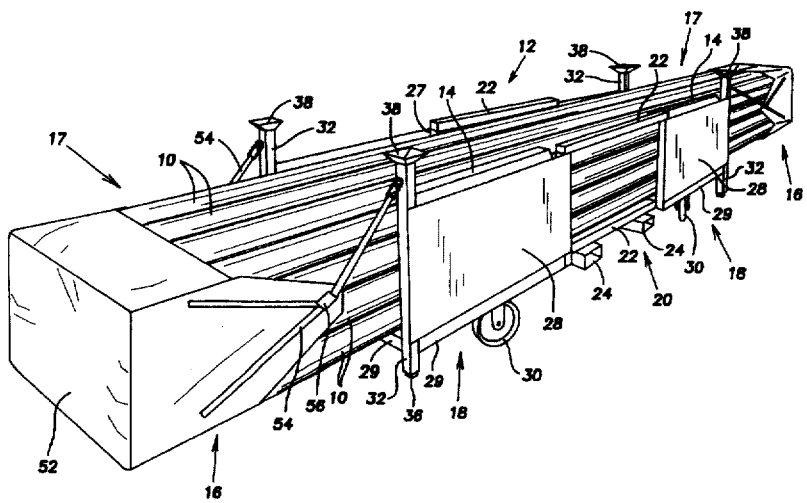

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 7 is cancelled.

Claims 1, 4 and 8 are determined to be patentable as amended.

Claims 2, 3, 5, 6 and 9–12 dependent on an amended claim, are determined to be patentable.

New claims 13–15 are added and determined to be patentable.

1. A returnable and reusable packaging and storing system for elongated tubular members, said system comprising a plurality of support plates, *a plurality of elongated tubular members received by said support plates, means for protecting cantilevered ends of said elongated tubular members*, and means for movably supporting said support plates, said support plates cooperating to define a series of elongated, generally horizontal channels, each of said channels surrounding and supporting [an] *one of said plurality of* elongated tubuler [member] *members*, said elongated channels being dimensioned to allow the tubular members to be slidably removed therefrom and inserted therein without interference from adjacent tubular members and to permit ends of said tubular members to project from the channels in a cantilever fashion, wherein said supporting means comprises a cart having a pair of support plate supporting sections and an open section intermediate the supporting sections, each of said supporting sections having a plurality of support plates stacked thereon, thereby forming a pair of stacks of support plates which are separated by the open section, said elongated channels defined by one stack of support plates are generally coaxially aligned with the elongated channels defined by the other stack of support plates, wherein coaxially aligned channels receive and support spaced-apart sections of one of the *plurality of* elongated tubular members.

4. A returnable and reusable packaging and storing system for elongated tubular members [according to claim 3], *said system comprising a plurality of support plates and means for movably supporting said support plates, each of said support plates comprise a series of upper and lower surface members which are interconnected by ramping surface members, the lower surface members of the support plates resting upon the upper surface members of a downwardly adjacent support plate, said support plates cooperating to define a series of elongated, generally horizontal channels, each of said channels surrounding and supporting an elongated tubular member, said elongated channels being dimensioned to allow the tubular members to be slidably removed therefrom and inserted therein without interference from adjacent tubular members and to permit ends of said tubular members to project from the channels in a cantilever fashion, wherein said supporting means comprises a cart having a pair of support plate supporting sections and an open section intermediate the supporting sections, each of said supporting sections having a plurality of support plates stacked thereon, thereby forming a pair of stacks of support plates which are separated by the open section, said elongated channels defined by one stack of support plates are generally coaxially aligned with the elongated channels defined by the other stack of support plates, wherein coaxially aligned channels receive and support spaced-apart sections of one of the elongated tubular members, and wherein each support plate includes reinforcement braces, said braces being provided between the upper surface members and the ramping members and between the lower surface members and the ramping members.*

8. A returnable and reusable packaging and storing system for elongated tubular members [according to claim 7], *said system comprising:*

*a plurality of support plates which cooperate to define a series of elongated, generally parallel channels, each of said channels receiving and supporting an elongated tubular member, wherein the channels are sized and dimensioned to allow the tubular members to be slidably inserted therein and removed therefrom without interference from adjacent tubular members;*

*a movable cart upon which the support plates are stacked, said cart including means for positioning and retaining said support plates thereon, said cart comprising a pair of support sections and an open section intermediate the support sections, each of said support sections having a plurality of support plates stacked thereon, thereby forming a pair of stacks of support plates which are separated by the open section, said elongated channels of one stack of support plates are generally coaxially aligned with the elongated channels in the other stack of support plates, wherein coaxially aligned channels receive and support spaced-apart sections of one elongated tubular member and* wherein elongated tubular members are received within the elongated channels and the cart is sized such that ends of the tubular members project or extend therefrom in a cantilever fashion [, said system further comprising]*; and,* means for protecting the cantilevered ends of the tubular members.

*13. A returnable and reusable packaging and storing system for elongated tubular members according to claim 4, wherein the upper surface member and a first pair of ramping members of a first support plate cooperate with the lower surface member and a second pair of ramping members of a second support plate to define one of the elongated channels.*

*14. A returnable and reusable packaging and storing system for elongated tubular members according to claim 4, wherein the cart includes means for aligning and retaining the support plates.*

*15. A returnable and reusable packaging and storing system for elongated tubular members according to claim 14, wherein the aligning and retaining means comprise a plurality of posts.*

* * * * *